United States Patent
Cappucci et al.

(10) Patent No.: US 6,838,155 B2
(45) Date of Patent: Jan. 4, 2005

(54) FOAM PAD AND PROCESS FOR PRODUCTION THEREOF

(75) Inventors: Debra Marie Cappucci, Allen Park, MI (US); Randall Joseph Lansue, Belleville, MI (US)

(73) Assignee: Woodbridge Foam Corporation (CA)

( * ) Notice: Subject to any disclaimer, the term of this patent is extended or adjusted under 35 U.S.C. 154(b) by 0 days.

(21) Appl. No.: 10/084,359

(22) Filed: Feb. 28, 2002

(65) Prior Publication Data

US 2003/0162008 A1 Aug. 28, 2003

(51) Int. Cl.[7] .............................. B32B 3/26; B68G 5/00; A47C 3/00
(52) U.S. Cl. ...................... 428/158; 428/122; 428/160; 428/159; 428/99; 428/100; 5/653; 5/655.9; 5/740; 5/953; 5/737; 5/402; 297/219.1; 297/226
(58) Field of Search ................................ 428/304.4, 99, 428/100, 76, 68, 71, 74, 158, 159, 122, 160; 5/655.9, 740, 953, 737, 402, 653; 297/219.1, 226

(56) References Cited

U.S. PATENT DOCUMENTS

| | | | |
|---|---|---|---|
| 4,317,591 A | | 3/1982 | Ramsey ...................... 297/455 |
| 5,236,243 A | * | 8/1993 | Reyes ...................... 297/219.1 |
| 5,605,373 A | | 2/1997 | Wildern, IV et al. .... 297/218.4 |
| 5,641,552 A | * | 6/1997 | Tillner ......................... 428/102 |
| 5,688,576 A | | 11/1997 | Ohno et al. .................. 428/100 |
| 5,723,197 A | | 3/1998 | Grund et al. ................ 428/122 |
| 5,942,177 A | * | 8/1999 | Banfield ...................... 264/134 |
| 5,972,465 A | | 10/1999 | Ohno et al. .................. 428/100 |
| 6,443,525 B1 | * | 9/2002 | Haupt ...................... 297/452.6 |

FOREIGN PATENT DOCUMENTS

| | | |
|---|---|---|
| DE | 44 46 450 | 4/1996 |
| DE | 195 30 279 | 12/1996 |
| DE | 298 21 697 | 3/1999 |
| DE | 299 17 372 | 2/2000 |
| EP | 0 659 118 | 6/1995 |
| FR | 2 777 879 | 10/1999 |
| WO | WO 02/092311 A1 | 11/2002 |

* cited by examiner

Primary Examiner—Terrel Morris
Assistant Examiner—Hai Vo
(74) Attorney, Agent, or Firm—Katten Muchin Zavis Rosenman

(57) ABSTRACT

A foam pad comprising a surface to which a trim cover can be secured, the surface comprising a channel having a width of up to about 15 mm. Disposed in the channel is one of a male portion or a female portion of a releasably engageable male-female trim cover attachment system. A trim cover having the other of the male or female portion attached thereto may be readily attached to the foam pad. A process and a mold for producing the foam pad are also described. The foam pad is particularly useful as a component of a vehicular seat system (e.g., seat bottom, seat back and the like).

48 Claims, 4 Drawing Sheets

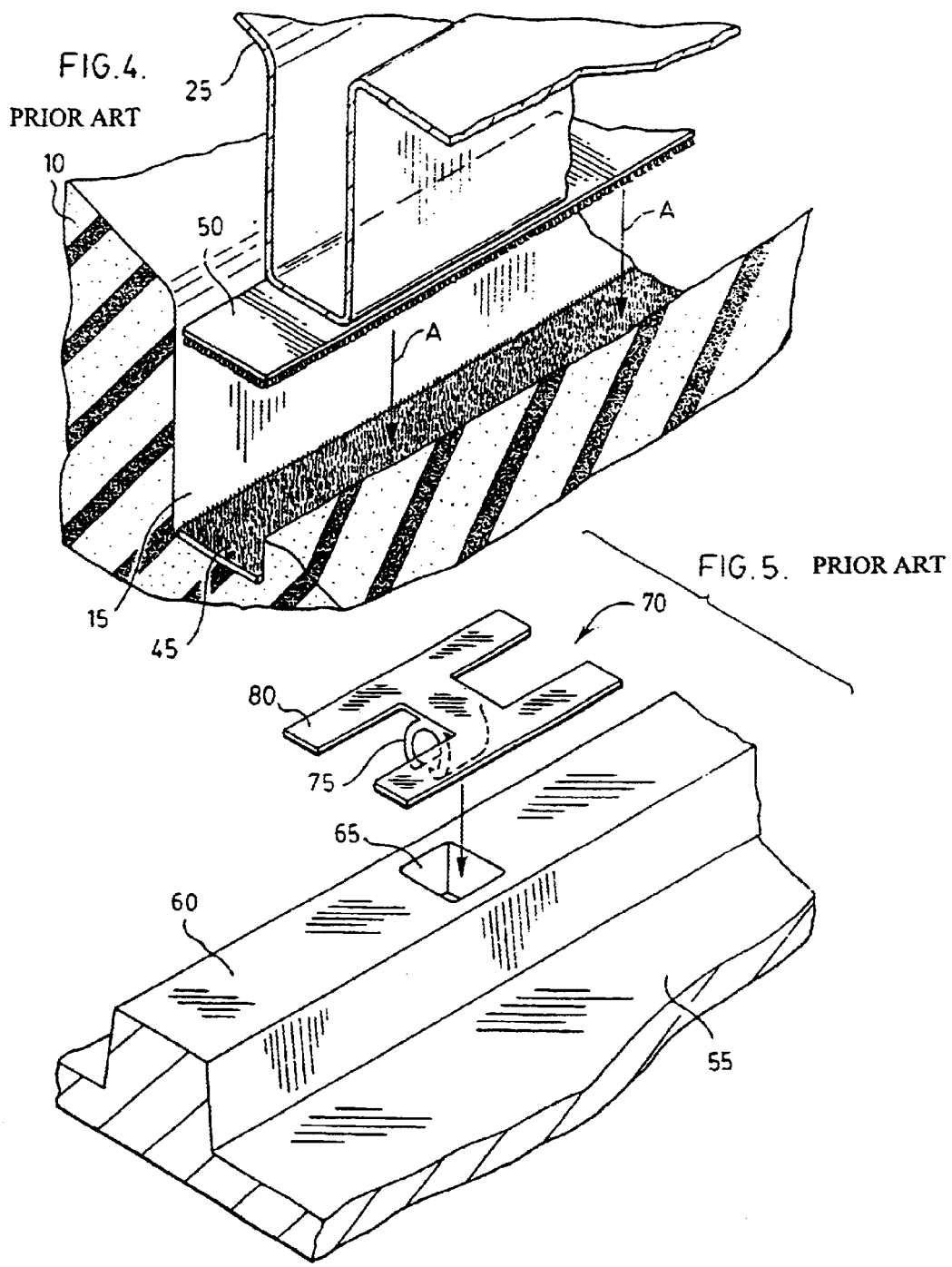

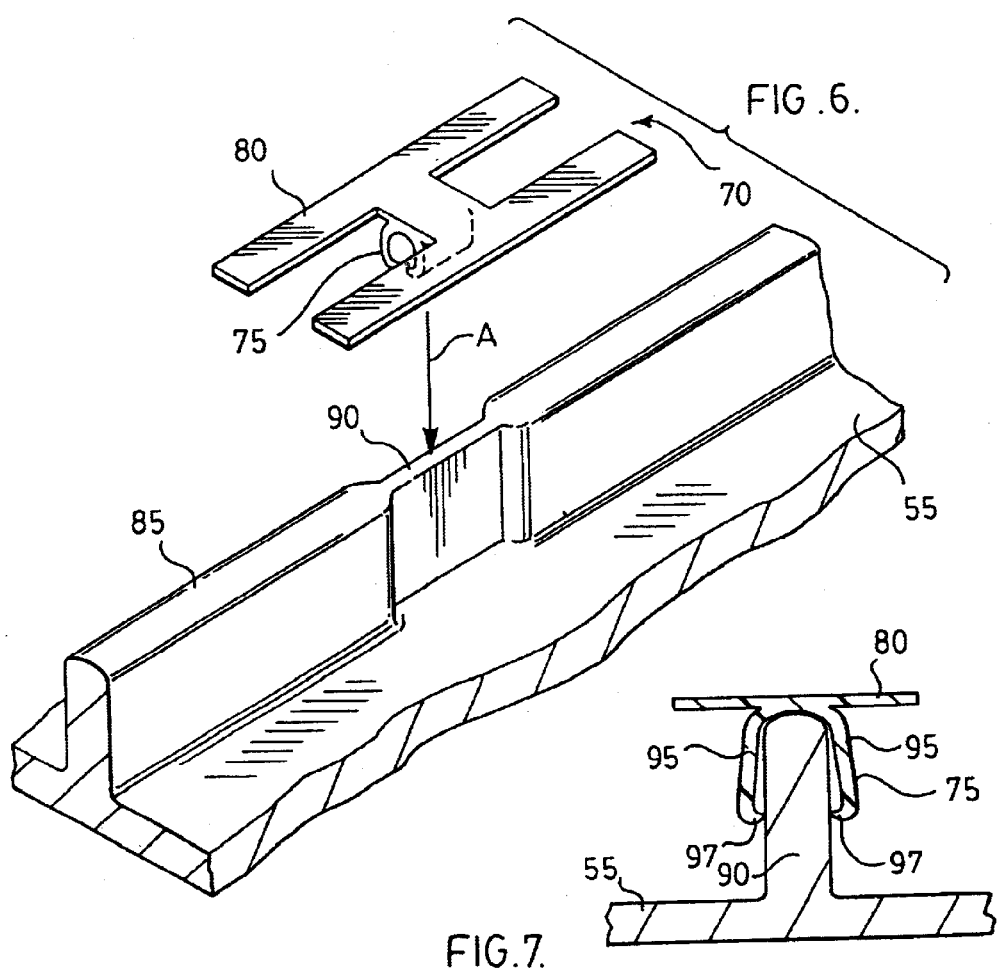

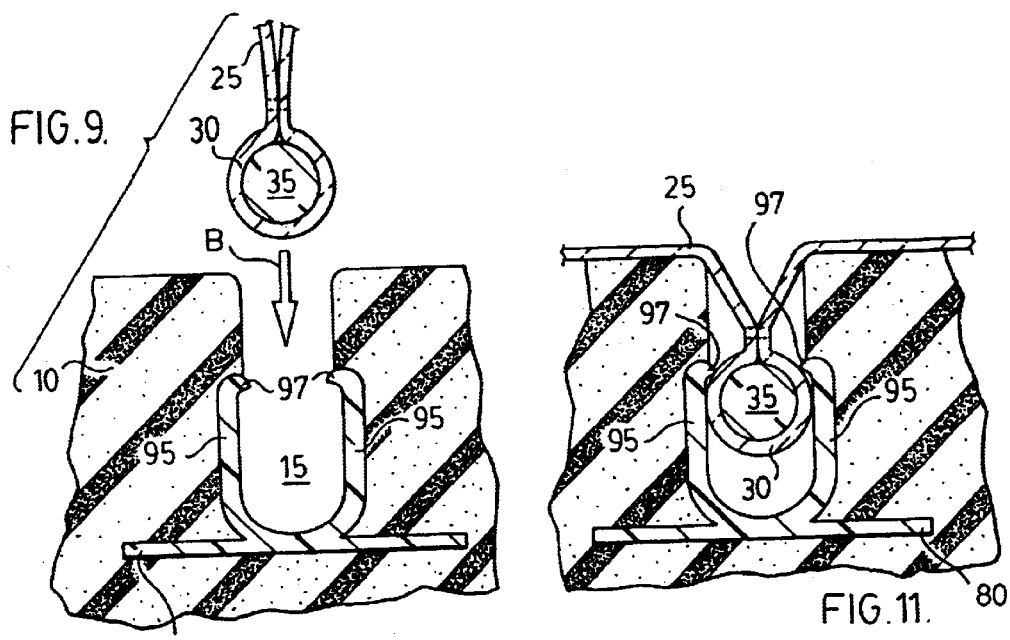
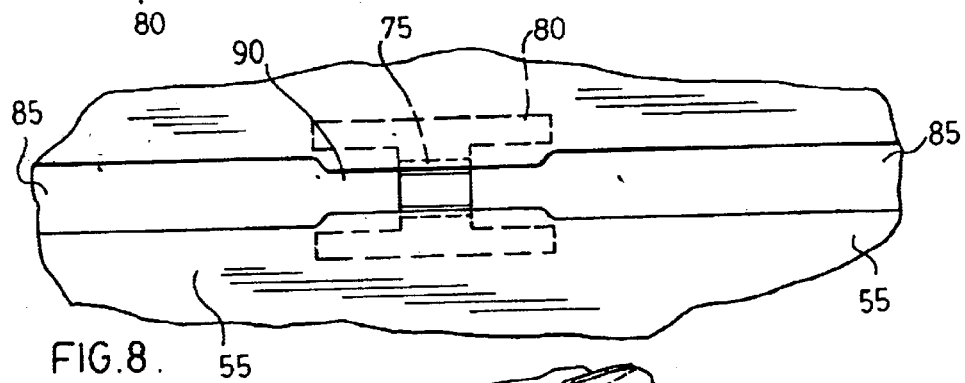
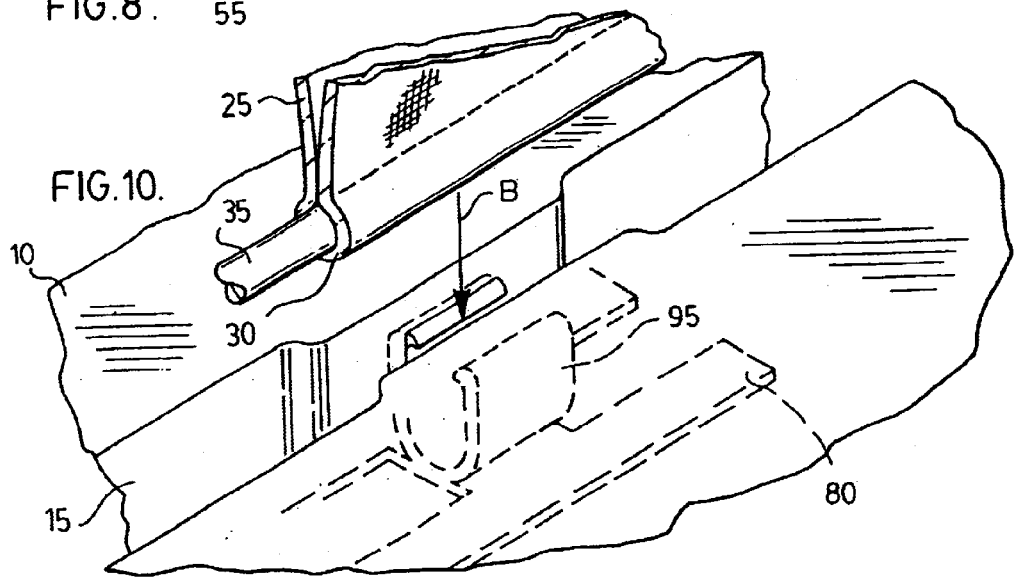

FOAM PAD AND PROCESS FOR PRODUCTION THEREOF

BACKGROUND OF THE INVENTION

1. Field of the Invention

In one of its aspects, the present invention relates to a foam pad, preferably a foam pad for use in a vehicular seat. In another of its aspects, the present invention provides a process for producing such a foam pad.

2. Description of the Prior Art

Attachment of a trim cover to a resilient device is generally known.

In most cases, the resilient device is a foam device, although, in some cases, a fibrous matrix such as rubberized horsehair and the like is still being employed. Typically, it is desired to secure a trim cover to a resilient device to produce a vehicular seat or a component of a vehicular seat.

There are three general categories of approaches in attachment of a trim cover to a resilient device: adhesive, foam-in-place and mechanical. The present invention relates to an improvement falling in the latter category and thus, prior art in this category will be discussed.

In the mechanical approach for attachment of a trim cover to a resilient device, there are (at least) four sub-categories. For ease of description, reference will be made to a foam device.

First, it is known in art to employ so-called "hog-rings" to secure a trim cover to a resilient device. In this approach, a metal wire is molded into the so-called A-surface of the foam device. The metal wire is exposed at selected spots, typically in a trench, on the surface of the foam device. A trim cover is provided and has a finished outer surface made of leather, cloth, vinyl or the like. Commonly attached to the underside of the trim cover is a non-woven material, a felt material and the like. A hard plastic (or other) bead is attached to the non-woven material. Of course other methods of attaching the hard plastic bead to the trim cover are used in the art. The trim cover is attached to the foam device by aligning the metal wire in the foam device with the hard plastic bead in the trim cover and thereafter engaging the two with a metal ring. Typically, the metal ring is deployed from a so-called hog-ring gun. This approach has been used for many years to secure a trim cover to a foam device. This approach suffers from a number of drawbacks. For example, a significant capital cost is required to acquire the hog-ring gun and a significant associated labor cost is required to ensure that trim covers can be attached to foam devices at a rate commensurate with the rate at which the foam device is being produced. Further, since deployment of the first hog-ring immovably secures the trim cover to foam device, there is no play or give. The result of this is that perfect placement of trim cover over the foam device must be achieved prior to deployment of the first hog ring to avoid significant loss of efficiency. Still further, this approach is difficult to use reliably when producing a vehicular seat product which incorporates one or more of a seat heater and an occupant detection system. Still further, the use of metal in the foam device creates additional cost in recycling the finished product after complete of its life cycle. A modification of this approach is to replace the metal wire typically molded into the A-surface of the foam device with a mounting device made of foam—see, for example, Canada patent application 2,165,930 [Grund et al.], published on Jun. 24, 1996 and DE 44 46 450 C1[Johnson Controls GmbH & Co.], granted Apr. 4, 1996. Another modification of this approach is to utilize a mechanical clip to connect the trim cover to the metal wire molded into the A-surface of the foam device—see, for example DE 195 30 379 C2 [Johnson Controls GmbH & Co.], published Dec. 19, 1996.

Second it is known to utilize a plurality of independent or single mechanical clips to secure the trim cover to the foam device. In this approach, a series of mechanical clips is molded in the A-surface of the foam device. Each mechanical clip typically comprises a base which is molded into the foam and a receptacle or clip portion which emerges from the foam at selected locations on the A-surface of the foam device. See, for example, one or more of the following prior art references:

DE 299 17 372 U1 [Johnson Controls GmBH & Co.], published Feb. 24, 2000; and

DE 298 21 697 U1 [Bertrand Faure Sitztechnik GmbH & Co.], published Mar. 25, 1999.

For a typical vehicular seat component (e.g., a seat bottom or a seat back), it is common to require 12–30 of these clips to be molded into the foam device. The current approach of using these clips is to cast a receptacle in the mold. The receptacle receives a clip portion while the base portion remains exposed so that it may be molded into the foam. The reason for using such a receptacle in the mold is that, in the prior art, it was thought to be critical to use such a receptacle to avoid foam fouling of the clip portion. The use of such a receptacle has led to casting a wide platform in the mold into which the receptacle is built. Unfortunately, the resulting foam pad or device contains a trench typically having a width of 20 mm or more. There is an ongoing need to avoid the presence of such wide trenches in foam pad which are utilized in vehicular seat applications.

Third, it is known to use so-called Velcro™-type fasteners to attach a trim cover to a foam device. These fasteners are also known in the art as touch fasteners or "hook and loop" fasteners. While this approach is reliable, it does suffer from a number of drawbacks. For example, this type of fastener is generally regarded one of the most expensive approaches to utilize to secure a trim cover to a foam device. Further, this approach is not well suited to fastening around a curve portion of the foam device without incurring significant wastage. Third, in many applications, the use of this approach necessitates the use of a wide fastener (20 mm or more) to achieve sufficient pullout strength. There is an ongoing need to avoid the presence of such wide trenches in foam pad which are utilized in vehicular seat applications.

Fourth, from U.S. Pat. No. 5,641,552 [Tillner], it is known to utilize an anchoring strip which is molded in A-surface of the foam device. The anchoring strip is in the form of a wide, flat connecting bar made of a molded plastic body (polypropylene is provided as an example) and having a series of C-clips disposed at various spots along its length. The wide, flat connecting bar is described as being flexible perpendicular to its main plane. It is clear that this is the only moment of flexibility of the wide, flat connecting bar. No information is provided in Tillner on how the anchoring strip is actually mold into the foam part.

Thus, despite the advances made to date, there is still room for improvement. Specifically, it would be advantageous to have a trim cover attachment technique that could be utilized with a foam pad in a manner which obviates or mitigates and least one of the above-mentioned drawbacks of the prior art.

SUMMARY OF THE INVENTION

It is an object of the present invention to provide a foam pad which obviates or mitigates at least one of the above-mentioned disadvantages of the prior art.

It is yet another object of the present invention to provide a novel process for production of the present foam pad.

Accordingly, in one of its objects, the present invention provides a foam pad comprising a surface to which a trim cover can be secured, the surface comprising a channel having a width of up to about 15 mm, the channel having disposed therein one of a male portion or a female portion of a releasably engageable male-female trim cover attachment system.

In another of its aspects, the present invention provides a process for producing a foam pad in a mold comprising a first mold portion and a second mold portion releasably engageable to define a mold cavity, the process comprising the steps of:

disposing a female portion of a releasably engageable male-female trim cover attachment system on a retainer disposed on at least one of the first mold portion and the second portion;

dispensing at least one of an expandable polymeric composition and expanded polymer particles in at least one of the first mold portion and the second mold portion;

closing the first mold portion and the second mold portion; and expanding the expandable polymeric composition or adhering the expanded polymer particles to each other to substantially fill the mold cavity and to at partially encompass at least a portion of the female portion to produce the foam pad.

In another of its aspects, the present invention provides a mold for producing a mold product, the mold comprising a first mold portion and a second mold portion releasably engageable to define a mold cavity, a rail disposed on at least on of the first mold portion and the second mold portion, rail having a width of less than about 15 mm along substantially its entire length, the rail comprising a first section and a second section having different widths.

The present inventors have developed a novel technique for attaching a trim cover to a foam. The technique has a combination of some or all of the following advantages:

can be used to produce foam pads having relatively narrow trenches (less than about 15 mm), provides for self-alignment of trim cover during attachment to the foam pad, utilizes a male-female trim cover attachment system which can be made of a polymer to facilitate recyclability of the final product, allows for implementation of relatively inexpensive mechanical fasteners (thereby obviating the use of relative expense approaches such as hook and loop (e.g., Velcro™) fasteners), simpler mode of attaching the trim cover to the foam pad thereby improving efficiency of commercial operations, can be used to provide foam pads having enhanced craftsmanship, can be implemented relatively easily thereby mitigate the requirement for highly trained personnel, allows for reduction in the need for secondary machine tooling thereby reducing the capital cost in equipment needed to carry out the process (cf. hook and loop fasteners which typically require the need for specialized tooling to accommodate magnets needed to secure fasteners in place), allows for the use of a universal mechanical attachment system thereby reducing inventory investment, allows for the use of convex and concave trench design, provides a relatively simplified manner by which foam intrusion in the mechanical attachment system may be obviated or mitigated, does not require the use of expensive and/or dangerous equipment to attach the trim cover (or other element) thereto, can be used to attach a trim cover (or other element) to a foam device around a curved portion, can be easily used to provide straight-line attachment of the trim cover (or other element) to the foam device, can provide some play or give during initial and final attachment of the trim cover (or other element) to the foam device, can be used to secure a trim cover (element) to a foam device without adversely affecting other elements of the foam device (e.g., heating elements, occupant detection systems and the like), can be used facilitate original assembly and subsequent disassembly of the foam device for maintenance or any other purpose, and does not render the final foam product difficult to demold.

BRIEF DESCRIPTION OF THE DRAWINGS

Embodiments of the present invention will be described with reference to the accompanying drawings, in which like reference numerals denote like elements, and in which:

FIG. 4 illustrates an enlarged perspective view of a second prior art technique for attaching a trim cover to a foam pad;

FIG. 5 illustrates an enlarged perspective view of conventional use of a prior art mechanical clip fastener in production of a foam element;

FIG. 6 illustrates an enlarged perspective view of attachment of a mechanical clip fastener to a portion of a mold as a step in the present process;

FIG. 7 illustrates a sectional view of a portion of the mold illustrated in FIG. 6 after the mechanical clip fastener has been placed on the former;

FIG. 8 illustrates a top view of FIG. 7;

FIGS. 9 and 10 illustrate the step of securing a trim cover to an embodiment of the present foam pad; and FIG. 11 illustrates a view similar to FIG. 9 after attachment of the trim cover to the foam pad.

DETAILED DESCRIPTION OF THE PREFERRED EMBODIMENTS

Figure 1:
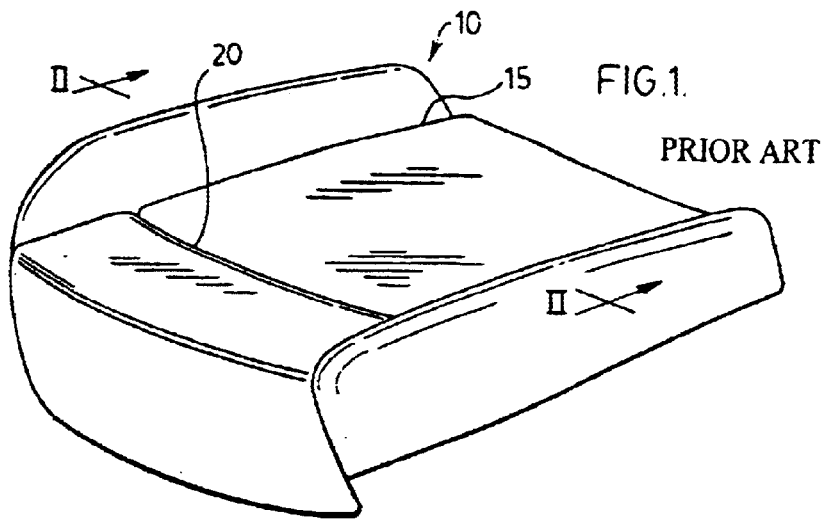
FIG. 1 illustrates a perspective view of the conventional foam pad used as a seat component of a vehicular seat.
Figure 2:
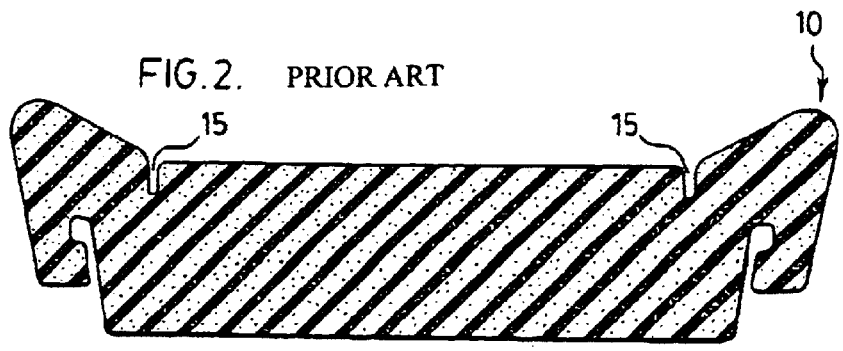
FIG. 2 illustrates a section along line II—II in FIG. 1.

With reference to FIGS. 1 and 2, there is illustrated a foam pad 10, typically used as a seat element in a vehicular seat component.

Typically, foam pad 10 will be molded from a foamable material such as an isocyanate based polymer system or from expanded polymer beads (e.g., polypropylene). For the purposes of the present invention, it is highly preferred that foam pad 10 be molded from an isocyanate-based polymer foam such as polyurethane foam, polyurea foam and the like.

During the molding process, it is common to mold into the surfaces of the foam of the various contours and trenches.

Specifically, as shown in FIGS. 1 and 2, foam pad 10 comprises a pair of substantially parallel trenches 15 and a transfer trench 20 which interconnects trenches 15. Trenches 15, 20 are disposed in what is typically referred to as the A-surface of foam pad 10. The underside of foam pad 10 is typically referred to as the B-surface of the foam element. As will be apparent below, trenches 15 and/or 20 can be a focal point in attachment of a trim cover to foam pad 10. Thus, in discussing various of the drawings below and to facilitate an understanding of both the prior art and the present invention, reference will be made to foam pad 10 and it's constituent elements for purposes of providing context the description of a particular trim cover attachment technique.

Before describing the foam embodiments of the present invention, a brief description will be provided on various of the prior art techniques discussed generally above.

Figure 3:
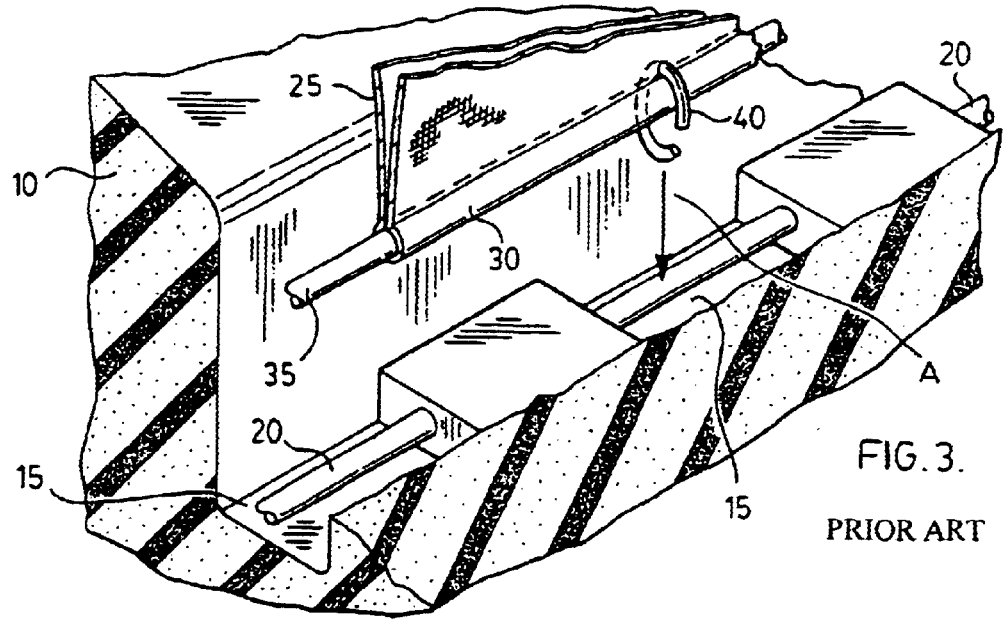
FIG. 3 illustrates an enlarged perspective view of a first prior art technique for attaching a trim cover to a foam pad.

Thus, with reference to FIG. 3, the so-called hog ring attachment system is illustrated. Generally, this comprises molding into trenches 15 of foam pad 10 a wire 20. Shown, wire 20 is exposed at selected areas of trench 15. A trim cover 25 is then provided and has a pocket 30 in which is disposed a wire 35. When it is desired to attach trim cover 25 to foam pad 10, wires 20 and 35 are brought into proximity with one another in the direction of Arrow A and, thereafter, a hog ring 40 is deployed from a conventional deployment gun (not shown) to secure wires 20 and 35 with respect to one another thereby securing trim cover 25 to foam pad 10. As described above, deployment of hog ring in this manner causes wires 20 and 25 to be tightly secured to one another with no give or play. Hog rings 40 are then deployed in various of the other spots on the A-surface of foam pad 10 where wire 20 is exposed in trench 15. As is known by those of skill in the art, hog rings 40 are not regard as being releasably engageable and must be cut off to disassemble the part. Indeed, as used throughout this specification, the term "male-female trim cover attachment system" is intended to exclude a hog ring attachment system.

With reference to FIG. 4, there is illustrated attachment of trim cover 25 using a so-called hook and loop fastener system. Thus, in this case, a first half 45 of a hook and loop fastener system is molded into (or otherwise secured with respect to) trench 15 in a conventional manner. Trim cover 25 has attached thereto a second half 50 of the hook and loop fastener system—first half 45 and second half 50 of the hook a loop fastener system complement one another. When it is desired to attach trim cover 25 to foam pad 10, the two elements are moved with respect to one another in the direction of Arrow A. Once first half 45 and second half 50 of the touch fastening system contact each other, trim cover 25 and foam pad 10 are secured to one another. As described above, it is conventional when using this type of fastening system to mold trench 15 such that it has a width of 20 mm or more. This is done to achieve sufficient pull-out strength of trim cover 25 after it has been secured to foam pad 10—i.e., it is important that the trim cover be resistant to a certain degree to being pulled out of trench 15. Those of skill in the art will recognize that the wider trench provides the ability to use a wider fastener thereby increasing overall fastener surface area and thus pull-out strength.

With reference to FIG. 5, there is illustrated an enlarged portion of a bowl 55 of a conventional mold (not shown) for producing a molded polyurethane foam part. Disposed on bowl 55 is a platform 60.

As will be appreciated by those of skill in the art, platform 60 results in formation of trench 15 in foam pad 10. Disposed in platform 60 is a receptacle 65. In this case, a mechanical clip 70 is provided and comprises a female attachment portion 75 connected to an H-shaped portion 80. Preferably, mechanical clip 70 is constructed of a polymer material such as a thermoplastic material (e.g., polyethylene, polypropylene and the like) or a thermoset material (e.g., polyurethane and the like). As described generally above, the conventional manner by which clip 70 is molded into foam pad 10 involves completely sealing clip portion 75 during the foaming process. In the illustrated embodiment, this is achieved by moving clip 70 in the direction of Arrow A thereby disposing clip portion 75 in receptacle 65.

Conventionally platform 60 (which produces trench 15) has a width similar to that which accommodates the hook and loop fastener system illustrated in FIG. 4—i.e., 20 mm or more.

With reference to FIGS. 6–8, there is illustrated various steps of a preferred embodiment of the present process. Thus, disposed on bowl 55 of the mold (not shown) is a rail 85 having a narrowed portion 90. As shown, clip 70 (which may be the same as clip 70 in FIG. 5) is lowered on to narrowed portion 90 such that clip portion 75 is releasably engaged to narrowed portion 90 of rail 85.

As shown particularly in FIG. 7, the releasable engagement of clip 70 on narrowed portion 90 of rail 85 is achieved by biasing open a pair of walls 95 of clip portion 75. Each of walls 95 has a locking portion 97 which comprises a hook or other engagement member which, in FIG. 7, is biased against narrowed portion 90 of rail 85. Indeed, it is highly preferred to have clips constructed from a suitable material such that walls 95 are reversibly biased thereby facilitating releasable engagement of clip 70 and a trim cover.

Once clip 70 is retained in position as shown in FIGS. 7 and 8, it is preferred to dispense a liquid foamable polymer composition (e.g., an isocyanate-based foamable composition, preferably a liquid foamable polyurethane composition) in bowl 55 of the mold (not shown). This foam composition would then be allowed to expand, preferably in a closed mold in conventional manner, to produce foam pad 10.

With reference to FIG. 9 there is shown an enlarged portion of foam pad 10 which has been demolded after the dispensing step described above with reference to FIGS. 7 and 8. Thus, it will be seen that a portion of clip 70 is encompassed by foam pad 10. Specifically, H-shaped portion 80 is embedded in foam pad 10 as shown. Further, the outer surface of walls 95 abut foam pad 10. Further, it will be seen that the inner surfaces of walls 95 effectively form trench 15. Finally, a portion of locking portion 97 of each of walls 95 protrudes into trench 15—this is seen clearly in FIG. 10.

When it is desired to attach trim cover 25 to foam pad 10, the former is moved in the direction of Arrow B toward trench 15 of foam pad 10. Wire 35 of trim cover 25 will bias open walls 95 as it contacts locking portions 97. Once wire 35 is clear of locking portions 97, trim cover 25 will be engaged by clip 70—this is seen in FIG. 11.

Various of the above-mentioned advantages of the present invention will be apparent from FIGS. 6–11.

For example, because clip portion 75 is not disposed in a receptacle during molding, rail 85 and narrowed portion 90 can be made relatively thin thereby providing trench 15 in foam pad 10 having a significantly narrow dimension. Practically, this translates into the ability to produce foam pad 10 having a trench with of up to about 15 mm, preferably a width of up to 12 mm, more preferably a width in the range from about 4 to about 10 mm, most preferably a width in the range of from about 4 to about 8 mm. Further, since the inner surface of walls 95 of clip portion 75 effectively forms part of trench 15, this results in a so-called self-alignment advantage—i.e., when trim cover 25 is clipped into clip portion 75 of clip 70, the only "entry point" for wire 35 of trim cover 25 is between locking portions 97. In other words, incorrect disposition of trim cover 25 outside of clip portions 75 of clip 70 is obviated or mitigated.

Preferably, clip portion 75 spans at least about 60%, more preferably at least about 70%, even more preferably at least about 80%, of the width of trench 15. Most preferably, clip portion 75 substantially the entire the width of trench 15.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. For example, it is possible to vary the specific design of clip 70 to accommodate other designs of clips for use in the present foam pad. The present process may advantageously be used with, and the present foam pad may advantageously comprise, any mechanical clip, preferably one having a female clip portion and a base portion to be encompassed by the foam body. Further, it is possible to interconnect a series of clips 70 by any suitable means. Still further, while reference is made to trim covers having wire 35 for clipping into clip 70, it will be appreciated by those with skill in the art that wire 35 can be replaced by any other suitable member such as a plastic (or other) bead having a circular or non-circular cross-section, a barbed-shaped element and a like. Further, walls 95 of clip portion 75 may be modified to be disposed in a substantially non-opposed orientation with respect to each other. Still further, with reference to FIG. 7, it is possible to modify narrowed portion 90 to substantially fit the profile of the interior walls 95 to avoid any foam intrusion although this is not necessary for the practice of the present process. Further, it is possible to modify the specific process discussed above to utilize expanded polypropylene beads (or any other expanded polymer beads) during which individual beads would be adhered together to produce a molded part without necessarily expanding individual beads. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

What is claimed is:

1. A foam pad comprising:
    a surface to which a trim cover can be secured, the surface comprising an open channel having a longitudinal axis and a maximum width of up to about 15 mm,
    the open channel having a first section, a second section, and a third section disposed serially along the longitudinal axis, the second section: (i) having a narrower width than the first and third sections when measured in a direction perpendicular to said longitudinal axis and (ii) having disposed therein one of a male portion or a female portion of a releasably engageable male-female trim cover attachment system.

2. The foam pad defined in claim 1, wherein the channel has a maximum width of up to about 12 mm.

3. The foam pad defined in claim 1, wherein the channel has a maximum width in the range of from about 4 to about 10 mm.

4. The foam pad defined in claim 1, wherein the channel has a maximum width in the range of from about 4 to about 8 mm.

5. The foam pad defined in claim 1, the channel having disposed therein the female portion of the releasably engageable male-female trim cover attachment system.

6. The foam pad defined in claim 5, wherein the foam pad comprises a plurality of female portions disposed in the channel.

7. The foam pad defined in claim 6, wherein the plurality of female portions are independent of one another.

8. The foam pad defined in claim 6, wherein the plurality of female portions are interconnected to one another with at least one connecting portion.

9. The foam pad defined in claim 5, wherein the female portion is constructed from a polymer.

10. The foam pad defined in claim 9, wherein the polymer is selected from the group comprising thermoset polymer and thermoplastic polymers.

11. The foam defined in claim 10, wherein the thermoplastic polymer is selected from the group consisting of polyethylene, polypropylene and mixtures thereof.

12. The foam pad defined in claim 10, wherein the thermoset polymer comprises polyurethane.

13. The foam pad defined in claim 5, wherein the female portion comprises a female attachment portion and base portion.

14. The foam pad defined in claim 13, wherein the base portion has a larger surface area than a surface area of the female attachment portion attached thereto.

15. The foam pad defined in claim 14, wherein at least a portion of the base portion is encompassed by the foam pad.

16. The foam pad defined in claim 13, wherein the female attachment portion spans the width of the channel second section.

17. The foam pad defined in claim 13, wherein the female attachment portion comprises a clip portion.

18. The foam pad defined in claim 17, wherein the clip portion comprises a substantially U-shaped cross-section.

19. The foam pad defined in claim 17, wherein U-shaped cross-section comprises a pair of generally upstanding walls defining a locking region therebetween for receiving a male portion of the male-female trim cover attachment system.

20. The foam pad defined in claim 19, wherein a distal portion of each of the upstanding walls comprises a locking portion for engaging the attachment portion of the element to be attached.

21. The foam pad defined in claim 20, wherein the locking portion comprises a first lateral portion projecting substantially toward the locking region.

22. The foam pad defined in claim 21, wherein the first lateral portion projects angularly with respect to the pair of generally upstanding walls.

23. The foam pad defined in claim 20, wherein the locking portion comprising a hook-shaped portion.

24. The foam pad defined in claim 1, further comprising a trim cover attached thereto, the trim cover comprising the other of the male portion or the female portion of the releasably engageable male-female trim cover attachment system.

25. A vehicular seat comprising the foam pad defined in claim 24.

26. A foam pad comprising:
    a surface to which a trim cover can be secured, the surface having molded therein an open channel having a longitudinal axis and a maximum width of up to about 5 mm, the open channel having a first section, a second section, and a section disposed serially along the longitudinal axis, the second section; (i) having a narrower width than the first and third sections when measured in a direction perpendicular to said longitudinal axis; and (ii) disposed in a portion thereof at least one female portion of a releasably engageable male-female trim cover attachment system, the female portion comprising a female attachment portion and a base portion.

27. The foam pad defined in claim 26, wherein the channel has a maximum width of up to about 12 mm.

28. The foam pad defined in claim 26, wherein the channel has a maximum width in the range of from about 4 to about 10 mm.

29. The foam pad defined in claim 26, wherein the channel has a maximum width in the range of from about 4 to about 8 mm.

30. The foam pad defined in claim 26, wherein the base portion has a larger surface area than a surface area of the female attachment portion attached thereto.

31. The foam pad defined in claim 30, wherein at least a portion of the base portion is encompassed by the foam pad.

32. The foam pad defined in claim 26, wherein the female attachment portion spans the width of the channel second section.

33. The foam pad defined in claim 26, wherein the female attachment portion comprises a clip portion.

34. The foam pad defined in claim 33, wherein the clip portion comprises a substantially U-shaped cross-section.

35. The foam pad defined in claim 34, wherein U-shaped cross-section comprises a pair of generally upstanding walls defining a locking region therebetween for receiving a male portion of the male-female trim cover attachment system.

36. The foam pad defined in claim 35, wherein a distal portion of each of the upstanding walls comprises a locking portion for engaging the attachment portion of the element to be attached.

37. The foam pad defined in claim 36, wherein the locking portion comprises a first lateral portion projecting substantially toward the locking region.

38. The foam pad defined in claim 37, wherein the first lateral portion projects angularly with respect to the pair of generally upstanding walls.

39. The foam pad defined in claim 36, wherein the locking portion comprising a hook-shaped portion.

40. The foam pad defined in claim 26, wherein the foam pad comprises a plurality of female portions disposed in the channel.

41. The foam pad defined in claim 40, wherein the plurality of female portions are independent of one another.

42. The foam pad defined in claim 40, wherein the plurality of female portions are interconnected to one another at least one connecting portion.

43. The foam pad defined in claim 26, wherein the female portion is constructed from a polymer.

44. The foam pad defined in claim 26, further comprising a trim cover attached thereto, the trim cover comprising a male portion of the releasably engageable male-female trim cover attachment system.

45. A vehicular seat comprising the foam pad defined in claim 44.

46. A foam pad comprising:

a surface to which a trim cover can be secured, the surface having molded therein an open channel having a longitudinal axis and a maximum width of up to about 15 mm, the open channel having a first section, a second section, and a third section disposed serially along the longitudinal axis, the second section: (i) having a narrower width than the first and second sections when measured in a direction orthogonal to said longitudinal axis; and (ii) having disposed in a portion thereof plurality of female portions of a releasably engageable male-female trim cover attachment system, the female portion comprising a clip portion and a base portion molded into the foam pad.

47. The foam pad defined in claim 46, further comprising a trim cover attached thereto, the trim cover comprising a male portion of the releasably engageable male-female trim cover attachment system.

48. A vehicular seat comprising the foam pad defined in claim 47.

* * * * *